United States Patent
Berke et al.

(10) Patent No.: US 10,990,291 B2
(45) Date of Patent: Apr. 27, 2021

(54) SOFTWARE ASSIST MEMORY MODULE HARDWARE ARCHITECTURE

(71) Applicant: Dell Products, L.P., Round Rock, TX (US)

(72) Inventors: Stuart Berke, Austin, TX (US); Gary Kotzur, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 15/620,086

(22) Filed: Jun. 12, 2017

(65) Prior Publication Data

US 2018/0356994 A1     Dec. 13, 2018

(51) Int. Cl.
*G06F 3/06* (2006.01)
*G06F 12/06* (2006.01)
*G06F 12/0873* (2016.01)
*G06F 9/38* (2018.01)
*G06F 12/0846* (2016.01)

(52) U.S. Cl.
CPC ............ *G06F 3/0611* (2013.01); *G06F 3/061* (2013.01); *G06F 3/0658* (2013.01); *G06F 3/0664* (2013.01); *G06F 3/0689* (2013.01); *G06F 9/3877* (2013.01); *G06F 12/06* (2013.01); *G06F 12/0873* (2013.01); *G06F 12/0848* (2013.01); *G06F 2212/1016* (2013.01); *G06F 2212/262* (2013.01); *G06F 2212/282* (2013.01); *G06F 2212/311* (2013.01); *G06F 2212/461* (2013.01); *G06F 2212/466* (2013.01)

(58) Field of Classification Search
None
See application file for complete search history.

(56) References Cited

U.S. PATENT DOCUMENTS 5,373,512 A * 12/1994 Brady ................. G06F 11/1008
                                                    714/48
5,815,675 A *  9/1998 Steele ................... G06F 13/161
                                                    710/113

(Continued)

OTHER PUBLICATIONS

Gary Kotzur, "Storage Assist Memory Module," U.S. Appl. No. 15/220,197, filed Jul. 26, 2016, 32 pages.

*Primary Examiner* — Sean D Rossiter
*Assistant Examiner* — Stephanie Wu
(74) *Attorney, Agent, or Firm* — Fogarty LLP (57) ABSTRACT

A software assist module of a system memory coupled to a host processor provides the ability to offload software operations from the host processor. The software assist module includes a first memory accessed by the host processor via a first chip select signal. The software assist module also includes a software assist controller accessed by the host processor via a second chip select signal. The software assist controller is configured to intercept data related to a software function offloaded from the host processor, where the data is intercepted from a first chip select signal used to access the first memory. The software assist controller utilizes the intercepted data to perform the offloaded function. Based on configuration instructions provided by the host processor via the second chip select signal, the software assist module performs the offloaded function incrementally as function data is intercepted or as a single operation after all data for a function has been intercepted.

20 Claims, 4 Drawing Sheets

(56) References Cited

U.S. PATENT DOCUMENTS

| | | | | |
|---|---|---|---|---|
| 6,151,641 A * | 11/2000 | Herbert | ............ | G06F 3/0607 710/22 |
| 6,912,687 B1 * | 6/2005 | Gates | ............ | G06F 11/1076 714/6.2 |
| 7,562,230 B2 * | 7/2009 | Komarla | ............ | G06F 3/0623 380/37 |
| 2002/0027557 A1 * | 3/2002 | Jeddeloh | ............ | G06F 12/1027 345/519 |
| 2007/0244987 A1 * | 10/2007 | Pedersen | ............ | H04L 69/10 709/217 |
| 2010/0313101 A1 * | 12/2010 | Kondo | ............ | G06F 11/1044 714/773 |
| 2011/0066925 A1 * | 3/2011 | Smith | ............ | G06F 11/10 714/805 |
| 2011/0295967 A1 * | 12/2011 | Wang | ............ | G06F 21/602 709/212 |
| 2012/0246443 A1 * | 9/2012 | Meir | ............ | G06F 12/06 711/209 |
| 2013/0297894 A1 * | 11/2013 | Cohen | ............ | G06F 3/0679 711/154 |
| 2013/0318268 A1 * | 11/2013 | Dalal | ............ | G06F 13/1652 710/113 |
| 2014/0189212 A1 * | 7/2014 | Slaight | ............ | G06F 12/0866 711/103 |
| 2014/0201761 A1 * | 7/2014 | Dalal | ............ | G06F 13/16 718/108 |
| 2014/0223094 A1 * | 8/2014 | Baderdinni | ............ | G06F 3/0689 711/114 |
| 2014/0281169 A1 * | 9/2014 | Mehrotra | ............ | G06F 12/0866 711/103 |
| 2015/0169238 A1 * | 6/2015 | Lee | ............ | G06F 12/0871 711/103 |
| 2015/0189047 A1 * | 7/2015 | Naaman | ............ | G06F 17/30545 370/474 |
| 2015/0286438 A1 * | 10/2015 | Simionescu | ............ | G06F 12/0246 711/103 |
| 2016/0085625 A1 * | 3/2016 | Amato | ............ | G06F 3/0619 714/766 |

* cited by examiner

SOFTWARE ASSIST MEMORY MODULE HARDWARE ARCHITECTURE

FIELD

This disclosure relates generally to memory systems for Information Handling System (IHS), and more specifically, to improving the speed and configurability of such memory operations.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

IHSs may be configured to incorporate various different types of storage devices organized into a storage system for use in providing data storage services. In some scenarios, such as for a laptop or other personal device, the storage system may be limited to storage to a single, local magnetic or solid-state storage drive. In enterprise scenarios, one or more servers may be configured as part of data storage systems that utilize arrays of storage devices, such as in a Redundant Array of Independent Disks (RAID) system. In all storage systems, faster operations are desirable, especially in light of the performance bottleneck that frequently results due to the latency of data storage operations.

Improvements to the performance of data storage systems may be categorized generally as either software-based solutions or hardware-based solutions. In general, software-based improvements tend to provide hardware agnostic solutions, at the cost of the additional time and computing resources that may be required to implement the software solution. Hardware-based improvements, on the other hand, can provide greater performance by maximizing the use of the capabilities of the particular hardware devices that comprise the storage system. Hardware solutions may also provide other benefits in addition to increasing performance of a storage system, such as reducing power consumption or improving availability of the stored data. Hardware solutions, however, may be costly since they may require specialized hardware and firmware that are tightly coupled and not easily upgraded.

With the increase in popularity of cloud-based storage system, software-based storage solutions have become increasingly common. For instance, certain storage systems are implemented as Software-Defined Storage (SDS) systems that utilize storage virtualization to operate independent from the underlying hardware. Accordingly, such SDS systems are designed to operate using commodity servers and may not be compatible with customized hardware, or at least may underutilize any non-commodity hardware. SDS data storage solutions may provide significant independence from the underlying hardware, but such hardware agnostic solutions are provided at the cost of slower, software-centric operations that may require significant processing resources.

SUMMARY

In various embodiments, a memory module is coupled to a host processor and the memory module includes a first memory accessed by the host processor via a first chip select signal; a software assist controller accessed by the host processor via a second chip select signal, wherein the software assist controller is configured to: intercept data related to a function offloaded from the host processor, wherein the data is intercepted from the first chip select signal used to access the first memory; and perform the offloaded function utilizing the intercepted data.

In various additional memory module embodiments, the offloaded function is a storage operation on a data storage system. In various additional memory module embodiments, the data storage system is a RAID (Redundant Array of Independent Disks) storage system. In various additional memory module embodiments, the offloaded function is a RAID parity operation. In various additional memory module embodiments, the software assist controller is further configured to: receive configuration instructions from the host processer via the second chip select signal, wherein the configuration instructions identify the data related to the offloaded function. In various additional memory module embodiments, based on the received configuration instructions, the software assist controller is further configured to perform the offloaded function incrementally as a portion of the data related to the offloaded function is intercepted on the first chip select signal. In various additional memory module embodiments, based on the received configuration instructions, the software assist controller is further configured to delay the performing of the offloaded function until all of the data related to the offloaded function is intercepted on the first chip select signal.

In various embodiments, a memory system includes a processor coupled to a memory controller; a system memory coupled to the memory controller via a memory bus, wherein the system memory comprises a software assist memory module; the software assist memory module comprising a first memory accessed by the memory controller via a first chip select signal, and further comprising a software assist controller accessed by the memory controller via a second chip select signal, wherein the software assist controller is configured to: intercept data related to a function offloaded from the processor, wherein the data is intercepted from the first chip-select signal used to access the first memory; and perform the offloaded function utilizing the intercepted data.

In various additional memory system embodiments, the offloaded function is a storage operation on a data storage system. In various additional memory system embodiments, the data storage system is a RAID (Redundant Array of Independent Disks) storage system. In various additional memory system embodiments, the offloaded function is a RAID parity operation. In various additional memory system embodiments, the software assist controller is further configured to receive configuration instructions from the processer via the second chip select signal, wherein the configuration instructions identify the data related to the offloaded function. In various additional memory system embodiments, based on the received configuration instructions, the software assist controller is further configured to perform the offloaded function incrementally as a portion of the data related to the offloaded function is intercepted on the first chip select signal. In various additional memory system embodiments, based on the received configuration instructions, the software assist controller is further configured to delay the performing of the offloaded function until all of the data related to the offloaded function is intercepted on the first chip select signal.

In various embodiments, an IHS (Information Handling System) includes a processor coupled to a memory controller; a system memory coupled to the memory controller via a memory bus, wherein the system memory comprises a removable software assist memory module; the removable software assist memory module comprising a first memory accessed by the memory controller via a first chip select signal, and further comprising a software assist controller accessed by the memory controller via a second chip select signal, wherein the software assist controller is configured to: intercept data related to a function offloaded from the processor, wherein the data is intercepted from the first chip-select signal used to access the first memory; and perform the offloaded function utilizing the intercepted data.

In various additional IHS embodiments, the offloaded function is a storage operation on a RAID (Redundant Array of Independent Disks) data storage system. In various additional IHS embodiments, the offloaded function is a RAID parity operation. In various additional IHS embodiments, the software assist controller is further configured to receive configuration instructions from the processer via the second chip select signal, wherein the configuration instructions identify the data related to the offloaded function. In various additional IHS embodiments, based on the received configuration instructions, the software assist controller is further configured to perform the offloaded function incrementally as a portion of the data related to the offloaded function is intercepted on the first chip select signal. In various additional IHS embodiments, based on the received configuration instructions, the software assist controller is further configured to delay the performing of the offloaded function until all of the data related to the offloaded function is intercepted on the first chip select signal.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Figure 1:
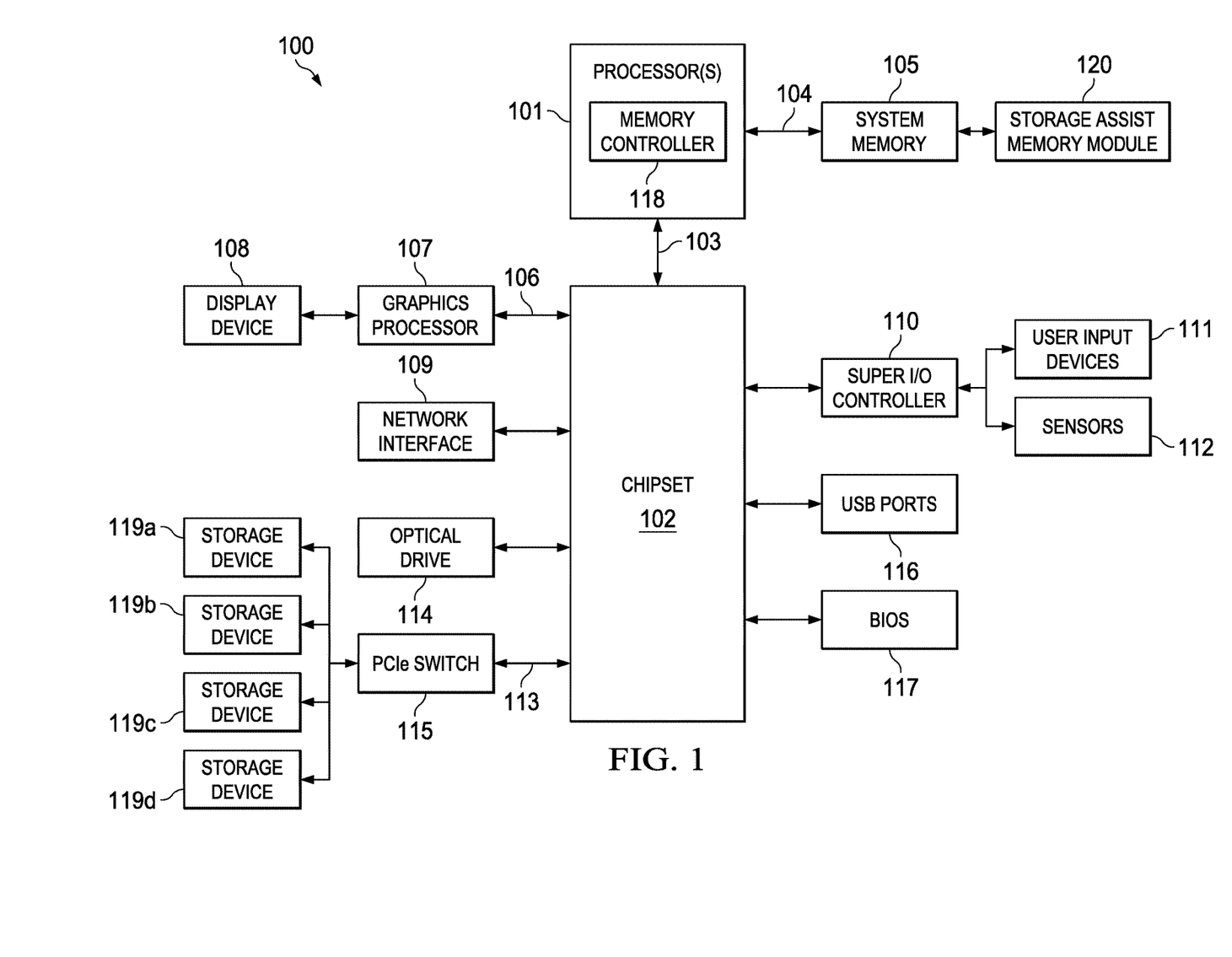
FIG. 1 is a block diagram depicting certain components of an IHS configured according to various embodiments to utilize a storage assist memory module.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below. FIG. 1 shows various internal components of an example IHS configured to implement the provided embodiments. It should be appreciated that although certain embodiments described herein may be discussed in the context of a server or other enterprise computing device, other embodiments may be utilize various other types of IHSs.

FIG. 1 is a block diagram illustrating certain components of an IHS 100 configured according to certain embodiments to utilize a storage assist memory module 120 that is a component of the system memory 105 of the IHS. In various embodiments, IHS 100 may be a component of a data storage system that may include any number of additional IHSs that may also utilize a storage assist memory module 120 in the same or similar manner to IHS 100. Although IHS 100 is illustrated with a single processor 101, other embodiments may include two or more processors, that may each be configured identically, or to provide specialized processing functions. Processor 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, the processor 101 includes an integrated memory controller 118 that may be implemented directly within the circuitry of the processor 101, or the memory controller 118 may be a separate integrated circuit that is located on the same die as the processor 101. The memory controller 118 may be configured to manage the transfer of data to and from the system memory 105 of the IHS 100. In certain embodiments, the memory controller 118 may also be responsible for refreshing any volatile memory components of the system memory 105. In certain embodiments, the memory controller 118 may be a DDR4 (Double Data Rate Four) compatible memory controller that operates utilizing both the rising and falling edges of the system clock of the IHS 100 in providing a high-speed memory interface 104 with the system memory 105. In certain other embodiments, the memory controller 118 may utilize other memory interfaces 104, such as the older DDR3 standard or DDR5, the planned replacement to DDR4. In certain embodiments, the memory controller 118 may be separate from the processor(s) 101 and may instead communicate with the processor(s) 101 via the chipset 102.

The system memory 105 that is coupled to processor 101 via the memory bus 104 provides the processor 101 with a high speed memory that may be used in the execution of computer program instructions by the processor 101. Accordingly, system memory 105 may include memory components, such as dynamic RAM (DRAM), suitable for supporting high-speed memory operations by the processor 101. As described in greater detail with respect to FIG. 2, the system memory 105 includes a storage assist memory module 120 that may be used to offload certain functions, such as certain data storage operations, from the processor 101 in a manner that reduces the time and resources needed by processor 101 in order to complete these offloaded functions.

IHS 100 includes a chipset 102 that may include one or more integrated circuits that are connect to processor 101. In certain embodiments, the chipset 102 may utilize a QPI (QuickPath Interconnect) bus 103 for communicating with the processor 101. In the embodiment of FIG. 1, chipset 102 is depicted as a separate component from processor 101. In other embodiments, all of chipset 102, or portions of chipset 102 may be implemented directly within the integrated circuitry of the processor 101. Chipset 102 provides the processor(s) 101 with access to a variety of resources provided by peripheral devices coupled to IHS 100.

Other resources may also be coupled to the processor(s) 101 of the IHS 100 through the chipset 102. In certain embodiments, chipset 102 may be coupled to a network interface 109, such as provided by a Network Interface Controller (NIC) that is coupled to the IHS 100. In certain embodiments, the network interface 109 may be coupled to the chipset 102 via a PCIe bus 112. According to various embodiments, network interface 109 may support communication via various wired and/or wireless networks. In certain embodiments, the chipset 102 may also provide access to one or more Universal Serial Bus (USB) ports 116.

Chipset 102 may also provide access to a graphics processor 107. In certain embodiments, graphics processor 107 may be comprised within one or more video or graphics cards that have been installed as components of the IHS 100. Graphics processor 107 may be coupled to the chipset 102 via a graphics bus 106 such as provided by an AGP (Accelerated Graphics Port) bus or a PCIe (Peripheral Component Interconnect Express) bus. In certain embodiments, the graphics processor 107 generates display information and provides the generated information to a display device 108 coupled to the IHS 100.

In certain embodiments, chipset 102 may also provide access to one or more user input devices 111. In such embodiments, chipset 102 may be coupled to a super I/O controller 110 that provides interfaces for a variety of user input devices 111, in particular low bandwidth and low data rate devices. For instance, super I/O controller 110 may provide access to a keyboard, mouse and/or other peripheral input devices. In certain embodiments, super I/O controller 110 may be used to interface with coupled user input devices 111 such as keypads, biometric scanning devices, and voice or optical recognition devices. The I/O devices may interface with the super I/O controller 110 through wired or wireless connections. In certain embodiments, the super I/O controller 110 may be coupled to the processor 101 via a Low Pin Count (LPC) bus.

Another resource that may be accessed by processor(s) 101 via chipset 102 is a BIOS (Basic Input/Output System) 117. Upon powering or restarting IHS 100, processor(s) 101 may utilize BIOS 117 instructions to initialize and test hardware components coupled to the IHS 100. The BIOS 117 instructions may also load an operating system for use by the IHS 100. The BIOS 117 provides an abstraction layer that allows the operating system to interface with certain hardware components that are utilized by IHS 100. Via this hardware abstraction layer provided by BIOS 117, the software executed by the processor(s) 101 of IHS 100 is able to interface with certain I/O devices that are coupled to the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI. In certain embodiments, the BIOS may be replaced, in full or in part, by a baseboard management controller (BMC) or another in-band or out-of-band (OOB) controller.

Chipset 102 also provides access to one or more storage devices 119a-d. In the illustrated embodiment, the chipset 102 utilizes a (Peripheral Component Interconnect Express) PCIe bus interface connection 113 to a PCIe switch 115 that is coupled to each of the storage devices 119a-d. In certain embodiments, chipset 102 may also provide access to other types of storage devices. For instance, in addition to the storage devices 119a-d accessed via the PCIe switch 115, an IHS 100 may also include one or more additional storage devices such as an optical drive 114 or a removable-media drive. In various embodiments, the storage devices 119a-d may be integral to the IHS 100, or may be external to the IHS 100. PCIe switch 115 may include any device or system configured to provide a PCIe-compliant input/output (I/O) interface between the processor 101 and storage devices 119a-d. In certain additional embodiments, the PCIe switch 115 may be replaced with a storage controller, which similarly provides access to the storage devices 119a-d.

In certain embodiments, the IHS 100 may utilize the storage devices 119a-d in the implementation of a RAID data storage system. In a RAID system, data may be distributed across an array of storage devices in such a manner that if one of the storage devices fails, the data stored on the failed storage device can be recovered from the remaining storage devices of the RAID system. Configured in this manner, the redundancy of RAID system increases fault tolerances and, in some scenarios, may also improve access to the stored data. As described, software-based storage systems, such as such SDS data storage systems, tend to utilize commodity servers and hardware components. In SDS and other software-based systems, rather than rely on a specialized hardware component such as a RAID controller, RAID functions may instead be implemented via software instructions that are executed by the processor 101. Such implementations allow for the flexibility of a software-based RAID solution that is not tied to specific hardware, but may run significantly slower when compared to implementations that utilize specialized hardware.

A RAID system may be implemented according to various different RAID levels, with each level utilizing different data storage techniques for providing redundant storage of the data in the array of storage devices 119a-d. For instance, in a RAID level 1 system, data redundancy is implemented using disk mirroring, which replicates a complete disk of data to be preserved. For instance, a first disk may be used to store received data, while a second disk is used to store an exact copy of the data stored on the first disk. If either of the disks fails, no data should be lost, since the data can be retrieved from the remaining disk. In RAID level 4 system, data is striped across the array of storage devices 119a-d. In the illustrated four storage device system, for example, three of the storage devices may be used to store received data and the fourth storage device may be used to store parity information that can be used to reconstruct the data stored on any one of the three striped storage devices. In a RAID level 5 system, data is striped across all of the disks of the array of storage devices 119a-d, and the parity information is likewise distributed across the array of storage devices 119a-d.

In various embodiments, an IHS 100 does not include all of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the processor 101 as systems-on-a-chip.

Figure 2:
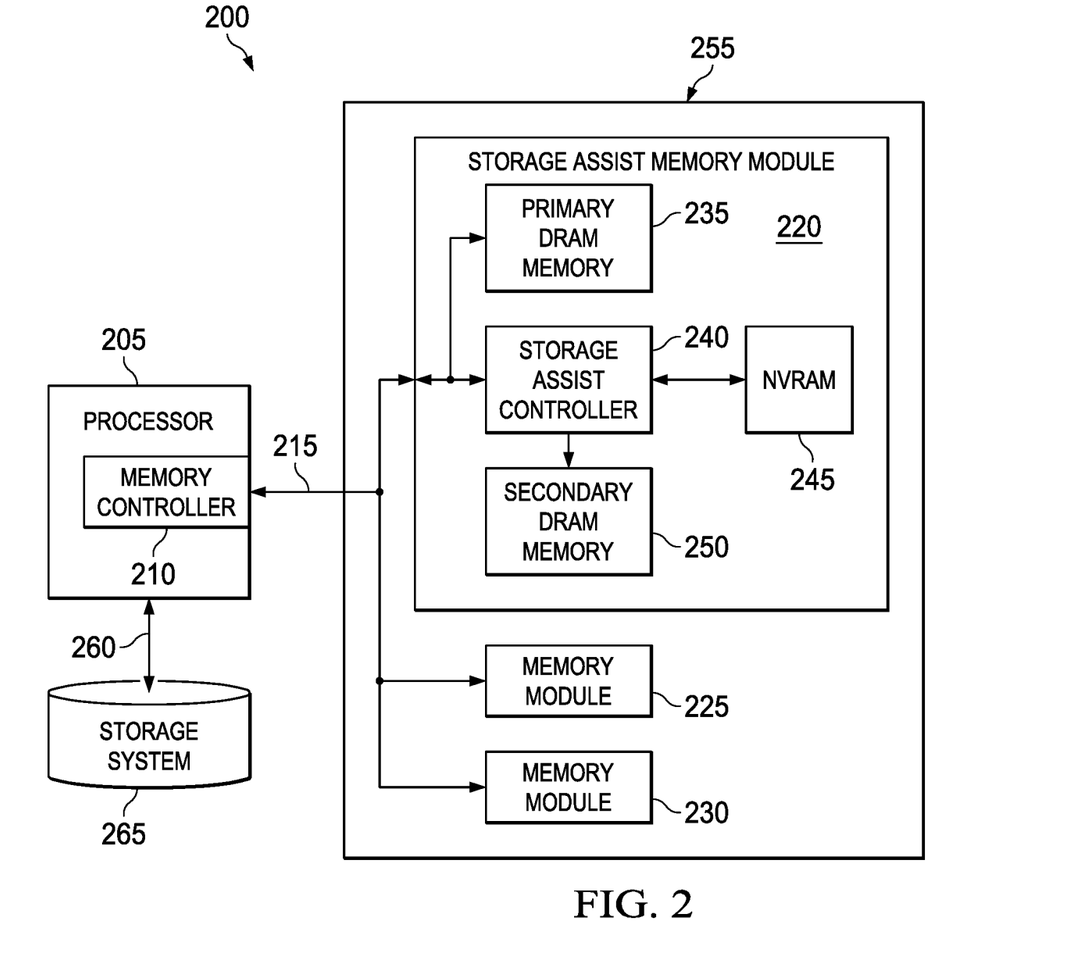
FIG. 2 is block diagram depicting certain components of a memory system that includes a storage assist memory module according to various embodiments.

FIG. 2 is block diagram illustrating certain components of a memory system 200 according to various embodiments. The host portion of the memory system 200 includes a processor 205 and memory controller 210. As described with respect to processor 101 of the embodiment of FIG. 1, processor 205 may be any processor capable of executing program instructions, such as the general-purpose system processor of an IHS. As described with respect to memory controller 118 of FIG. 1, memory controller 210 may be integrated directly within the circuitry of processor 205. As with the memory controller 118 of FIG. 1, memory controller 210 manages the transfer of data to and from a system memory 255 on behalf of processor 205. Certain embodiments may utilize additional memory controllers that may similarly manage the transfer of data to and from system memory 255 on behalf of processor 205. In certain of such embodiments, each of the multiple memory controllers may be utilized to support a separate memory channel, such as a DDR4 channel, between the processor 205 and the system memory 255.

The memory system 200 includes a system memory 255 that is comprised of three memory modules 220, 225 and 230. Each of the memory modules 220, 225 and 230 corresponds to a motherboard memory socket that receives a memory module, such as a DIMM (Dual In-line Memory Module), that can be coupled to the socket. Other embodiments may be configured with memory socket interfaces that correspond to different types of memory modules, such as a Dual In-line Package (DIP) memory, a Single In-line Pin Package (SIPP) memory, a Single In-line Memory Module (SIMM), and/or a Ball Grid Array (BGA) memory. In the illustrated embodiment, memory module 220 is a storage assist memory module according to various embodiments. Memory modules 225 and 250 may be DIMM memory devices, or may be any other type of memory module suitable for use in a high-speed system memory.

In the embodiment of FIG. 2, storage assist memory module 220 may be coupled to the system memory 225 via a DIMM motherboard memory socket. Other embodiments of the storage assist memory module 220 may utilize variants of the DIMM socket interface. In other embodiments, the storage assist memory module 220 may be coupled to the system memory 225 via a type of memory socket interface other than a DIMM or a variant thereof, such as the socket interfaces described above. A more detailed description of the physical aspects of the storage assist memory module 220 is provided with respect to FIG. 3. As with other DIMM-compatible memory devices, the storage assist memory module 220 may be manually removed from the system memory 255 and may then be replaced in the same memory socket or may be placed in another compatible socket in the system memory of the IHS, or a compatible socket of a different IHS.

As illustrated, storage assist memory module 220 includes a primary DRAM memory 235 and a storage assist controller 240 that is coupled to a NVRAM memory 245. The storage assist memory module 220 also includes a secondary DRAM memory 250. Other embodiments may include additional DRAM memory components that may be utilized in a similar manner to the secondary DRAM memory 250. In the illustrated embodiment, the primary memory 235 and the secondary memory 250 are DRAM memory. Other embodiments may utilize other types of suitable high-speed memory technologies besides DRAM for the primary and secondary memory components, such as synchronous DRAM (SDRAM), solid-state memory, Spin-Transfer Torque Magnetoresistive RAM (STT-MRAM), Magnetoresistive random-access memory (MRAM), Phase Change Memory (PCM), ferroelectric RAM, and/or any other memory device technology suitable for use as the system memory of an IHS.

In the embodiment of FIG. 2, the host processor 205 utilizes a bus interface 260 in order to interoperate with a data storage system 265. As described with respect to the embodiment of FIG. 1, this bus interface 260 may be a PCIe bus interface connection between the host processor 205 and a PCIe switch that provides access to a storage system 265 that may include one or more storage devices, such as an array of storage drives configured as part of a RAID storage system. The host processor 205 may execute instructions that result in the operation of the storage system 265 via commands issued on the bus interface 260. For instance, the host processor 205 may execute instructions that result in write data commands being issued to the storage system 265.

In scenarios where the storage system 265 is a RAID system, these write operations may result in the processor 205 issuing RAID write data commands to the storage system. As described, certain levels of RAID storage systems may protect the write data from potential loss by replicating and distributing portions of the write data across the multiple storage drives that are available within the RAID system. Also as described, certain levels of RAID storage systems may also utilize parity information that can be used to reconstruct any of the striped portions of the stored data, if any of the individual RAID storage drives fails. In certain levels of RAID storage systems, parity information is generated based on a series of Exclusive OR (XOR) operations on the individual striped portions of the write data that are distributed across the multiple storage drives. In certain other RAID level storage systems, parity information is generated based not only on the new write data, but also on aspects of the previous data that is being overwritten by the new write data. For instance, in a level 5 RAID storage system, parity information for new write data is generated based on a series of XOR operations on the striped portions of the new write data, the striped portions of the overwritten data, and the parity information for the overwritten data.

Accordingly, implementing RAID functions such as level 5 RAID parity calculations for new write data may require multiple storage system 265 read operations in order to load the information necessary to calculate the parity information for the new write data. Specialized hardware, such as a RAID controller, can be designed and used to perform parity read and write operations and parity calculations. However, as described above, software-based storage systems, such SDS systems, may be built utilizing commodity hardware and without utilizing specialized hardware such as a storage controller or RAID controller. In such software-based storage systems, storage operations such as RAID parity operations are implemented in software programs that are run on the host processor. In many cases, these software-implemented storage functions executed on commodity hardware may run significantly slower than specialized hardware solutions.

In order to increase the speed of certain software functions, such as RAID parity operations, the host processor 205 may be configured to utilize a storage assist memory module 220 according to various embodiments. The storage assist memory module 220 may be used to offload certain storage functions in order to improve the speed at which these storage functions may be completed, while also reducing the burden on the host processor 205 resulting from these storage functions. Various memory module embodiments may be similarly utilized to improve the speed of various software operations by offloading these software operations from the host processor 205. Certain steps of a process by which embodiments may utilize the storage assist memory module 220 are provided in FIG. 4.

Figure 4:
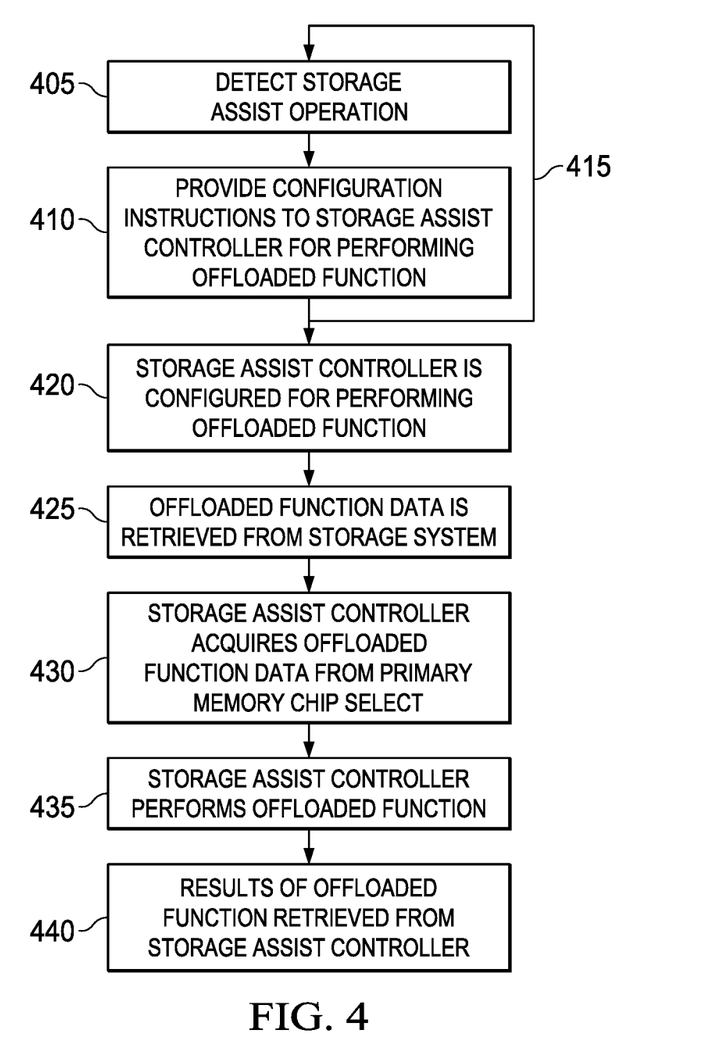
FIG. 4 is flowchart diagram depicting certain steps of a process for the use of a storage assist memory module according to various embodiments.

The storage assist process may begin at step 405 with the detection of an operation that can be at least partially offloaded from the host processor 205 to the storage assist memory module 220. For instance, the offloaded function may be a storage operation such as the described RAID parity operations. In addition to RAID operations, the functions that can be offloaded to the storage assist memory module 220 may also include other types of storage operations, such as erasure coding. In other embodiments, the operations that may be offloaded may include storage operations that require calculating metadata that is associated with the stored data. For instance, in certain embodiments the storage operations that may be offloaded may include storage functions that include hash calculations that are offloaded to the storage assist memory module 220. Other embodiments may offload table functions to the storage assist memory module 220, such as the generation of database keys. Certain embodiments may offload certain aspects of cyclic redundancy check (CRC) calculations, such as the calculation of check values that are used to detect any modifications to data. Certain embodiments may offload aspects of various other software operations via a memory module such as the described storage assist memory module 220. At step 405, the storage system software executed by the host processor 205 detects any such storage or other software operations for which offloading to the storage assist memory module 220 is supported.

Once a software function for which offloading is supported has been detected, at step 410, the host processor 205 configures the storage assist memory module 220 for offloading of the detected function. In certain embodiments, the storage assist memory module 220 may include a set of registers, or similar data storage locations, which may be used to store configuration parameters for the offloading of a detected function. In such embodiments, the configuration of the storage assist memory module 220 may include storing memory addresses in these registers, where these memory addresses correspond to the data associated with an offloaded function. For instance, when offloading certain aspects of the parity operations associated with a level 5 RAID parity information, the data needed for the parity calculation is identified by the storage system software that is executed by the host processor 205. In this specific level 5 RAID scenario, the parity calculation requires the new write data, as well as the overwritten data and the parity information for the overwritten data.

In certain embodiments, the storage system 265 may specify an address range for each type of data associated with an function that may be offloaded, where these address ranges corresponds to locations in system memory 255, in particular the primary DRAM memory 235, where the function data will be stored. In the level 5 RAID parity calculation scenario, the configuration instructions provided by the host processor 205 may specify an first address range in primary DRAM memory 235 for the new data, a second address range in primary DRAM memory 235 for the overwritten data, and a third address range in primary DRAM memory 235 for the parity information for the overwritten data. In such scenarios, at step 410, the configuration registers of the storage assist memory module 220 are used to store configuration parameters for the offloaded function, including these memory address ranges corresponding to the overwritten data and the parity information for the overwritten data.

In addition to specifying the memory addresses corresponding to the data associated with the offloaded function, at step 410, the host processor 205 may further configure the storage assist memory module 220 by clearing memory space that will be used by the storage assist memory module 220 in the execution of the offloaded storage function. For instance, when offloading storage functions include parity calculations, the configuration of the storage assist memory module 220 may include clearing and allocating memory space sufficient for the parity calculation. As illustrated in FIG. 2, the storage assist memory module 220 includes a secondary DRAM memory 250 that may be utilized by the storage assist controller 240 in performing the offloaded function. Upon receiving configuration instructions for an offloaded function from the host processor 205, the storage assist controller 240 may allocate memory space in the secondary DRAM memory 250 for the data associated with the offloaded function. In certain embodiments, a portion of NVRAM 245 may also be allocated for use in calculating function data, such as the calculation of new parity data or the calculation of a hash value. In certain embodiments, NVRAM 245 may be used instead of, or in conjunction with, the secondary DRAM memory 250 to store function data. In certain embodiments, a suitable memory embedded within the storage assist controller 240 may be used instead of, or in conjunction with, the secondary DRAM memory 250 to store function data.

At step 420, the storage assist memory module 220 prepares to execute the software function to be offloaded, as specified by the configuration instructions provided by the host processor 205. In certain embodiments, at step 415, the host processor may detect additional software functions that may be at least partially offloaded to the storage assist memory module 220. Each such additional function that is detected by the host processor 205 may result in additional configuration of the storage assist memory module 220. In certain of such embodiments, each software function that has been configured for offloading may be independently executed by the storage assist memory module 220. In this manner, each such software function that is offloaded to the storage assist memory module 220 may be considered a separate thread of execution.

Upon configuring the storage assist memory module 220, at step 425, the host processor 205 may proceed with retrieving the data from the storage system 265 necessary to complete the software function that is being offloaded to the storage assist memory module 220. The data that is retrieved from the data from the storage system 265 will vary according to the particular offloaded operation. In scenarios where the offloaded function is a level 5 RAID parity calculation corresponding to a write operation to a RAID storage system, the retrieved data includes the striped data to be overwritten and the parity information corresponding to the data to be overwritten. In scenarios where the offloaded function is a hash calculation, the data retrieved from the storage system 265 includes the data to be hashed. Other offloaded functions may be similarly supported at step 425 by the host processor's 205 retrieval of the necessary data from the storage system 265.

At step 430, the storage assist controller 240 component of the storage assist memory module 220 acquires the offloaded function data retrieved from the storage system 265. In order to utilize the retrieved function data, the function data is stored to the system memory 255, in particular the function data is stored to the specified memory address ranges in the primary DRAM memory 235. As described, the host processor 205 utilizes a memory controller 210 to control the transfer of data to and from the system memory 255. The memory controller 210 may access the system memory 225 according to one or more ranks that logically subdivide the system memory 255. In various embodiments, the system memory 255 may be divided into any number of ranks. The memory locations that comprise a single rank may be accessed simultaneously by the memory controller 210. In certain embodiments, individual components of the system memory 255, such as the primary DRAM memory 235, may be subdivided into multiple ranks. In the illustrated embodiment, the storage assist memory module 220 is configured such that the primary DRAM memory 235, or at least a portion of the primary DRAM memory 235 that has been designated for use in offloading functions, is accessed by the memory controller 210 using a single rank. The storage assist memory module 220 is further configured to utilize a second rank for accessing the storage assist controller 240. Additional ranks may be used by the memory controller 210 to access other components of the system memory 255, such as memory modules 225 and 230.

Upon retrieving the offloaded function data from the storage system 265, the host processor 205 utilizes the memory controller 210 to store the function data to system memory 255. In particular, the host processor 205 and memory controller 210 may be configured to store such retrieved data corresponding to an offloaded function to the specified memory address ranges in primary DRAM memory 235. As described, the memory controller 210 may utilize a first rank for accessing the primary DRAM memory 235 and a second rank for accessing the storage assist controller 240. Accordingly, at step 410, this second rank is utilized by the memory controller 210 in configuring the storage assist controller 240 for offloading of a function to the storage assist memory module 220. At step 430, the first rank is utilized by the memory controller 210 for storing the retrieved offloaded function data to the memory address ranges in primary DRAM memory 235 that were specified in the configuration instructions provided to the storage assist controller 240 at step 410.

In order for the storage assist controller 240 to acquire the retrieved data corresponding to an offloaded function, the storage assist controller 240 may be configured to intercept data on the first rank utilized by the primary DRAM memory 235, in addition to receiving offload configuration and other inputs from the memory controller 210 via the second rank. As described, at step 410, the storage assist controller 240 may be configured for offloading of a function by the host processor 205. As described, one aspect of this configuration may include providing the storage assist controller 240 with memory addresses ranges in the primary DRAM memory 235 corresponding to the function data required for performing an offloaded function. At step 430, the storage assist controller 240 utilizes these provided memory address ranges while monitoring the first rank inputs to the primary DRAM memory 235 in order to identify and capture the data for an offloaded function, as this function data is being stored to the primary DRAM memory 235.

In certain embodiments, the function data intercepted on the first rank by the storage assist controller 240 is mirrored to the secondary DRAM memory 250 of the storage assist memory module 220. In such embodiments, the storage assist controller 240 may have exclusive access to the secondary DRAM memory 250 via one or more ranks that logically subdivide the secondary DRAM memory 250. The storage assist controller 240 may utilize these ranks to access the secondary DRAM memory 250 in order to retrieve the mirrored function data for use in performing the offloaded function and to retrieve the results of the offloaded function that may be stored in the secondary DRAM memory 250.

Configured in this manner, the storage assist controller 240 may intercept and mirror the retrieved data corresponding to an offloaded function at the same time this retrieved data is written to the primary DRAM memory 235 by the memory controller 210. In certain embodiments, the storage assist controller 240 may be configured to perform the offloaded functions, at step 435, as the function data is acquired from the first rank inputs to the primary DRAM memory 235. For instance, in a scenario where the offloaded function is a level 5 RAID parity operation corresponding to a RAID write data command, the storage assist controller 240 acquires the new write data, the retrieved striped data to be overwritten, and the retrieved parity information for the data to be overwritten, as this function data is written to the primary DRAM memory 235 via the first rank access by the memory controller 210. In such scenarios, the storage assist controller 240 utilizes the acquired function data to calculate the new parity information for the new write data, such that this parity calculation function is offloaded from the host processor 205.

As described, certain RAID parity information may be calculated based on a series of XOR operations on the retrieved data to be overwritten, the retrieved parity information for the data to overwritten, and the new write data. Since the order in which a series of XOR operations are conducted has no bearing on the final result of the operation, the storage assist controller 240 may incrementally calculate the updated parity information as the needed function data is acquired from the first rank access of the primary DRAM memory 235. Configured in this manner, at step 435, the storage assist controller 240 may generate the parity information for the new write data in real time as the retrieved function data is stored to the primary DRAM memory 235 by the memory controller 210. In such embodiments, the parity information generated by the storage assist controller 240 may be available immediately upon the receipt of the complete set of function data necessary to execute the offloaded function.

In certain embodiments, the storage assist controller 240 may store the results of an offloaded operation in a register of the storage assist controller that has been designated for this purpose. In certain embodiments, this register may be designated at step 420, in response to the configuration instructions provided by the host processor 205 at step 410. In embodiments where the storage assist controller 240 executes the offloaded function on-the-fly, as the function data is intercepted, the host processor 240 may be configured to retrieve the results, at step 400, from the specified register immediately after the data for the offloaded function has been stored to system memory 255. In other embodiments, the storage assist controller 240 may be configured to retrieve the results from the specified register and provide these results to the host processor 205 upon request.

In certain embodiments, the storage assist controller 240 may be configured to wait until all function data corresponding to an offloaded function is received from the host processor 205 before beginning the execution of an offloaded operation. In certain of such embodiments, the configuration instructions provided by the host processor 205 at step 410 may indicate that the storage assist controller 240 may utilize delayed processing for a particular offloaded function. In such scenarios, the storage assist controller 240 may mirror the data corresponding to an offloaded function in secondary DRAM memory 250 as each individual data element for an offloaded function is intercepted during its transfer to primary DRAM memory 235. The memory address ranges in secondary DRAM memory 250 used to store the received data for an offloaded function may be configured, at step 420, by the storage assist controller 240 based on the configuration instructions provided by the host processor 205.

Upon detecting that all data necessary for performing an offloaded function has been received, the storage assist controller 240 may retrieve the function data from the secondary DRAM memory 250 and utilize available processing resources to calculate the results of the offloaded operation. In embodiments where the storage assist controller 240 manages multiple threads of execution, each corresponding to a pending offloaded function, the storage assist controller 240 may prioritize the processing of offloaded functions that are ready for execution based on their pendency. Upon execution of an offloaded function, the storage assist controller 240 may be configured to store the results in a register that may be designated, at step 420, for storing the results of an offloaded operation based on the configuration instructions provided by the processor at step 410. In such delayed-processing scenarios, the host processor 205 may periodically poll the storage assist controller 240 on the second rank until the results of the offloaded operation are available. In such scenarios, the storage assist controller 240 may respond to a polling request for the results of a specific offloaded function by accessing the portion of the secondary DRAM memory 250 allocated for this particular offloaded function in order to retrieve the results for this offloaded function and to respond to the second rank polling request from the host processor 205.

Regardless of whether the host processor 205 configures the storage assist controller 240 for performing an offloaded function on-the-fly or utilizing delayed processing, the offloading of a function frees the host processor 205 from performing the offloaded function. In embodiments where the storage assist controller 240 supports on-the-fly processing for an offloaded function, the host processor 205 benefits from the offloading of this processing task without having to wait for the results of the offloaded operation. When configured in this manner, the storage assist memory module 220 may provide a mechanism by which certain processing functions can be offloaded without introducing any delays into the performance of the offloaded function. In light of the high-speeds at which system memory operations are performed in modern IHSs, any delays in the processing of certain offloaded functions may be noticeable and/or problematic. The storage assist controller 240 may be configured to provide on-the-fly calculation of certain offloaded functions in such a manner that does not introduce delays into high-speed memory operations, and the storage assist controller 240 may be configured for delayed processing of offloaded functions, thus also providing software-based data storage systems with the flexibility of offloading functions and polling for the results when ready.

Figure 3:
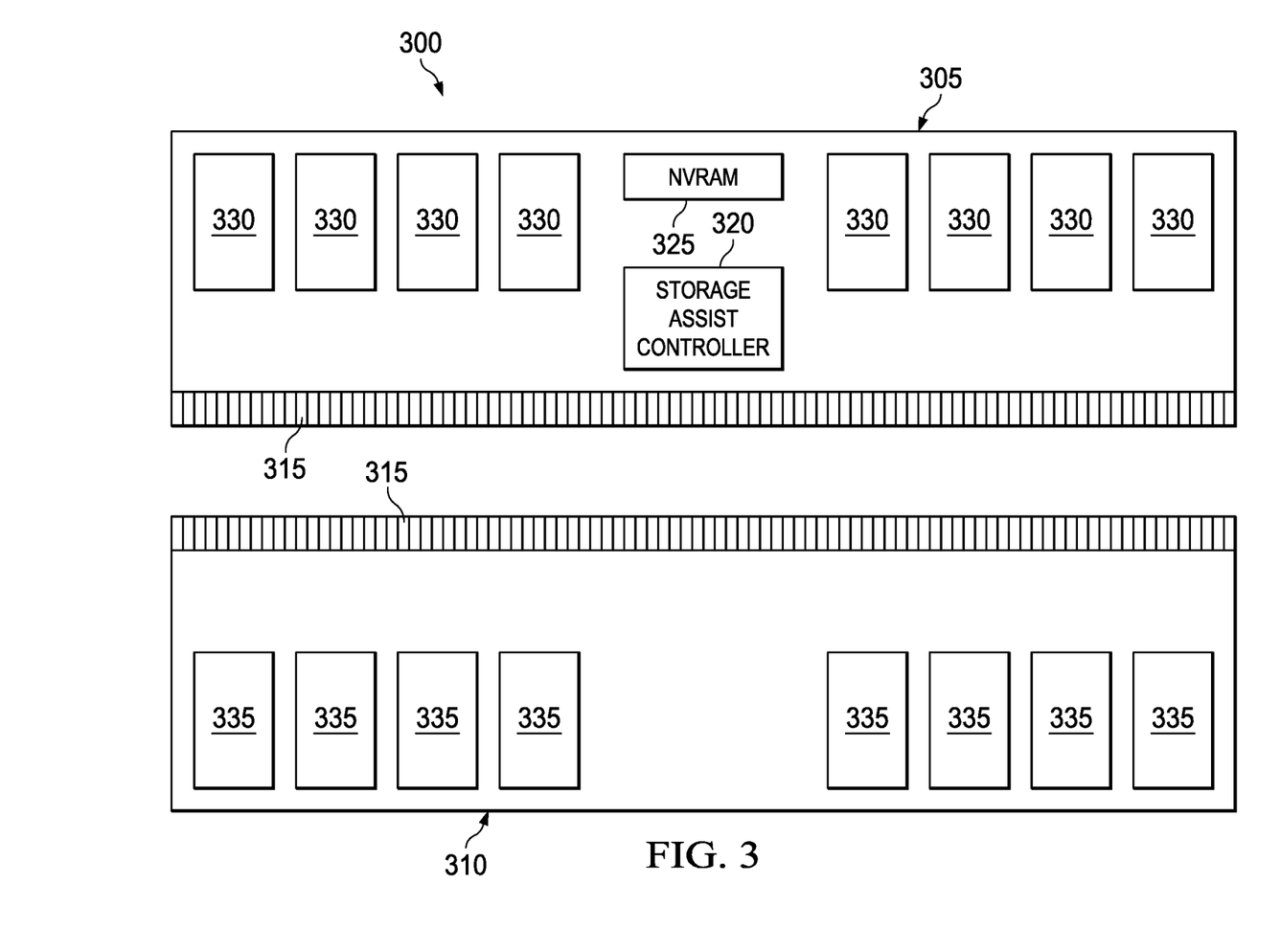
FIG. 3 is block diagram depicting certain components of a storage assist memory module according to various embodiments.

FIG. 3 is a diagram illustrated two sides of a storage assist memory module 300 according to various embodiments. As described, the storage assist memory module 300 may be plugged into a system memory socket, such as a DIMM socket that is provided on the motherboard of an IHS and which interfaces with the memory controller of the IHS via a high speed interface, such as one or more DDR4 channels. The storage assist memory module 300 may be a two-sided memory module that includes components on the front side 305 and the back side 310. Each side of the storage assist memory module 300 includes electrical contacts 315 that mate with corresponding pins of a system memory socket. The number, type and configuration of the electrical contacts 315 may vary based on the type of memory interface being utilized. For instance, memory sockets that utilize a DDR4 memory interface may utilize 284 pins that mate with corresponding electrical contacts 315, thus establishing a memory interface that may support one or more DDR4 channels between the memory controller and the storage assist memory module 300.

As illustrated in FIG. 3, the storage assist memory module 300 includes a storage assist controller 320. As described, the storage assist controller 320 may be used to offload certain storage or other software functions that would otherwise be processed by the host processor. In various embodiments, the storage assist controller 320 may include a processing component such as a microprocessor, microcontroller, application-specific integrated circuit (ASIC), or field-programmable gate array (FPGA). In various embodiments, the storage assist controller 320 may utilize any other digital or analog circuitry configured to interpret and/or execute program instructions. Also as described, the storage assist controller 320 may include one or more registers that may be used to store the results of offloaded operations.

As described with respect to FIGS. 2 and 4, the storage assist controller 320 may utilize a primary DRAM memory 235, a secondary DRAM memory 250 and NVRAM 245 in the processing of the offloaded function. In embodiments such as illustrated in FIG. 3, the primary DRAM memory 235 may be implemented by primary memory chips 330 located on one side of the storage assist memory module 300 and the secondary DRAM memory may be implemented by secondary memory chips 335 located on the other side of the storage assist memory module 300. As described, the storage assist controller 320 may allocate space in secondary memory chips 335 for mirroring the function data acquired from the chip select of the primary memory chips 330. In certain scenarios, the NVRAM 325 may be utilized by the storage assist controller 320 in the incremental calculation of certain offloaded functions, such as the calculation of level 5 RAID parity operations.

In certain embodiments, the storage assist controller 320 may utilize an internal scratchpad memory that may serve as a high-speed cache memory. As described, in certain embodiments, the storage assist controller 320 may be configured to provide multi-threaded operations, where each thread corresponds to a pending offloaded function. When supporting a single thread that provides on-the-fly calculation of offloaded functions, the storage assist controller 320 may utilize a single scratch pad for caching the received data and the incremental calculations required for the offloaded function. In embodiments that support delayed processing of offloaded functions, the storage assist controller 320 may utilize multiple internal scratchpad memories, with each scratchpad dedicated for use by a thread that executes a single offloaded function. In certain embodiments, the storage assist controller 320 may utilize memory ranges in NVRAM 325 as scratch pad memory.

In the illustrated embodiment, the storage assist memory module 300 includes primary memory chips 330 on the front side 305 and secondary memory chips 335 on the second side 310. In certain embodiments, all of the primary and secondary memory chips 330 and 335 are the same type of high-speed memory suitable for system memory, such as DRAM. In certain other embodiments, the primary memory chips 330 may be a high-speed volatile memory, such as DRAM, and the secondary memory chips 335 may be non-volatile memory that is implemented using memory technologies such as MRAM, which may provide high-speed performance suitable for use in system memory while also providing non-volatile storage.

In certain embodiments, combinations of volatile and non-volatile primary and secondary memory chips 330 and 335 may be used by the storage assist memory module 300 in implementing a Non-Volatile Dual In-line Memory Module (NVDIMM) that includes a persistent memory, such as NAND flash, and a volatile memory, such as DRAM. NVDIMM utilizes its volatile memory for normal operations, but is configured to transfer the data from volatile memory to the persistent memory upon a loss of power, whether expected or unexpected. In certain embodiments, an NVDIMM utilizes a dedicated backup power source, such as a battery or charged capacitor, which provides the power necessary to transfer data to persistent memory upon an unexpected loss of power. Other embodiments may utilize similar memory technologies in primary and secondary memory chips 330 and 335. For instance, certain embodiments may utilize NVDIMM-N memory that is comprised of a volatile memory that is mirrored by a flash memory, as specified by JEDEC, which refers to the Joint Electron Device Engineering Council and the JEDEC Solid State Technology Association. In other embodiments, primary and secondary memory chips 330 and/or 335 may be implemented using high-speed non-volatile memory technologies, such as INTEL 3D XPoint and other SCM (Storage Class Memory) technologies that provide non-volatile storage as speeds suitable for use in a system memory.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A DIMM (Dual In-line Memory Module) comprised of a plurality of memory chips, wherein the DIMM is coupled to a host processor of an IHS (Information Handling System) via a DIMM socket of a motherboard of the IHS, the DIMM comprising:

a first memory chip of the DIMM coupled to the motherboard DIMM socket of the IHS, wherein the first memory chip is accessed by the host processor of the IHS via a first chip select signal as a first rank of the DIMM, wherein memory locations of the first rank are accessible simultaneously by the host processor; and a software assist controller mounted on a first side of the DIMM coupled to the motherboard DIMM socket of the IHS, wherein the software assist controller is accessed by the host processor via a second chip select signal as a second rank of the DIMM, wherein the software assist controller is configured to:

intercept data related to a storage operation offloaded from the host processor of the IHS, wherein the data is intercepted from the first chip select signal used to access the first memory chip of the DIMM, and wherein the storage operation comprises an operation on a data storage system accessed by the host controller via a first bus interface;

receive configuration instructions for the offloaded storage operation from the host processor via the second chip select signal of the DIMM; and perform the offloaded storage operation utilizing the intercepted data.

2. The memory module of claim 1, wherein the data storage system comprises a RAID (Redundant Array of Independent Disks) storage system.

3. The memory module of claim 2, wherein the offloaded storage operation comprises a RAID parity operation.

4. The memory module of claim 1, wherein, based on the received configuration instructions, the software assist controller is further configured to:

perform the offloaded storage operation incrementally as a plurality of data portions for performing the offloaded storage operation are intercepted on the first chip select signal.

5. The memory module of claim 1, wherein, based on the received configuration instructions, the software assist controller is further configured to:

delay the performing of the offloaded storage operation until all of the data related to the offloaded storage operation is intercepted on the first chip select signal.

6. The memory module of claim 1, wherein the software assist controller comprises a plurality of registers storing parameters of the configuration instructions received via the second chip select signal.

7. The memory module of claim 6, wherein the configuration instructions stored to the plurality of registers comprise memory addresses of the data storage system, wherein the memory addresses correspond to data associated with the offloaded storage operation.

8. The IHS claim 6, wherein the software assist controller comprises a plurality of registers storing parameters of the configuration instructions received via the second chip select signal.

9. A memory system comprising:

a processor coupled to a memory controller;

a system memory coupled to the memory controller via a memory bus, wherein the system memory comprises a removeable DIMM (Dual In-line Memory Module) coupled to a DIMM socket of a motherboard of an IHS (Information Handling System), and wherein the removeable DIMM comprises a software assist controller mounted on a first side of the removeable DIMM; and the removeable DIMM comprised of a plurality of memory chips and coupled to the memory controller via a DIMM motherboard socket of the IHS, wherein the removeable DIMM comprises a first memory chip accessed by the memory controller via a first chip select signal as a first rank of the DIMM, wherein memory locations of the first rank are accessible simultaneously by the processor, and further comprising the software assist controller mounted on a first side of the DIMM and accessed by the memory controller via a second chip select signal as a second rank of the DIMM, wherein the software assist controller mounted on the DIMM is configured to:

intercept data related to a storage operation offloaded from the processor, wherein the data is intercepted from the first chip-select signal used to access the first memory chip of the DIMM, and wherein the storage operation comprises an operation on a data storage system accessed by the processor via a first bus interface;

receive configuration instructions for the offloaded storage operation from the processor via the second chip select signal of the DIMM; and perform the offloaded storage operation utilizing the intercepted data.

10. The memory system of claim 9, wherein the data storage system comprises a RAID (Redundant Array of Independent Disks) storage system.

11. The memory system of claim 10, wherein the offloaded storage operation comprises a RAID parity operation.

12. The memory system of claim 9, wherein, based on the received configuration instructions, the software assist controller is further configured to:

perform the offloaded storage operation incrementally as a plurality of data portions for performing the offloaded storage operation are intercepted on the first chip select signal.

13. The memory system of claim 9, wherein, based on the received configuration instructions, the software assist controller is further configured to:

delay the performing of the offloaded storage operation until all of the data related to the offloaded storage operation is intercepted on the first chip select signal.

14. The memory system of claim 9, wherein the software assist controller comprises a plurality of registers storing parameters of the configuration instructions received via the second chip select signal.

15. The memory system of claim 14, wherein the configuration instructions stored to the plurality of registers comprise memory addresses of the data storage system, wherein the memory addresses correspond to data associated with the offloaded storage operation.

16. An IHS (Information Handling System) comprising:

a processor coupled to a memory controller;

a system memory coupled to the memory controller via a memory bus, wherein the system memory comprises a removable memory module coupled to a memory socket of a motherboard of an IHS (Information Handling System), and wherein the removeable memory module comprises a software assist controller mounted on a first side of the removeable memory module, and wherein the removeable memory module comprises at least one of a DIMM (Dual In-line Memory Module), a Dual In-line Package (DIP) memory module, a Single In-line Pin Package (SIPP) memory module, a Single In-line Memory Module (SIMM), and/or a Ball Grid Array (BGA) memory module; and the removable memory module comprised of a plurality of memory chips and coupled to the memory controller via a motherboard socket of the IHS, wherein the removeable memory module comprises a first memory chip accessed by the memory controller via a first chip select signal as a first rank of the memory module, wherein memory locations of the first rank are accessible simultaneously by the host processor, and further comprising the software assist controller mounted on a first side of the memory module and accessed by the memory controller via a second chip select signal as a second rank of the memory module, wherein the software assist controller is configured to:

intercept data related to a storage operation offloaded from the processor, wherein the data is intercepted from the first chip-select signal used to access the first memory chip, and wherein the storage operation comprises an operation on a data storage system accessed by the processor via a first bus interface;

receive configuration instructions for the offloaded storage operation from the processor via the second chip select signal; and perform the offloaded storage operation utilizing the intercepted data.

17. The IHS of claim 16, wherein the data storage system comprises a RAID (Redundant Array of Independent Disks) data storage system.

18. The IHS of claim 17, wherein the offloaded function comprises a RAID parity operation.

19. The IHS of claim 16, wherein, based on the received configuration instructions, the software assist controller is further configured to:

perform the offloaded storage operation incrementally as a plurality of data portions for performing the offloaded storage operation are intercepted on the first chip select signal.

20. The IHS of claim 16, wherein, based on the received configuration instructions, the software assist controller is further configured to:

delay the performing of the offloaded storage operation until all of the data related to the offloaded storage operation is intercepted on the first chip select signal.

* * * * *